(12) United States Patent
Tsui

(10) Patent No.: US 8,659,915 B2
(45) Date of Patent: Feb. 25, 2014

(54) VALLEY-DETECTION DEVICE FOR QUASI-RESONANCE SWITCHING AND METHOD USING THE SAME

(75) Inventor: Cheng-Wen Tsui, Taipei (TW)

(73) Assignee: SYNC Power Corp., Taipei (TW)

( * ) Notice: Subject to any disclaimer, the term of this patent is extended or adjusted under 35 U.S.C. 154(b) by 234 days.

(21) Appl. No.: 13/352,666

(22) Filed: Jan. 18, 2012

(65) Prior Publication Data

US 2013/0182463 A1 Jul. 18, 2013

(51) Int. Cl.
*H02M 3/335* (2006.01)

(52) U.S. Cl.
USPC ............... 363/21.03; 363/21.02; 363/21.16; 363/21.04

(58) Field of Classification Search
USPC .......... 363/21.02, 21.03, 21.04, 21.08–21.12, 363/21.16–21.18
See application file for complete search history.

(56) References Cited

U.S. PATENT DOCUMENTS

| | | | | |
|---|---|---|---|---|
| 7,426,120 B2 * | 9/2008 | Yang et al. | | 363/21.15 |
| 8,094,468 B2 * | 1/2012 | Yang et al. | | 363/21.18 |
| 8,144,486 B2 * | 3/2012 | Moon et al. | | 363/21.12 |
| 8,279,634 B2 * | 10/2012 | Lin | | 363/21.05 |

* cited by examiner

*Primary Examiner* — Bao Q Vu
*Assistant Examiner* — Zekre Tsehaye
(74) *Attorney, Agent, or Firm* — Muncy, Geissler, Olds & Lowe, P.C.

(57) ABSTRACT

A valley-detection device for quasi-resonance switching and a method using the same is disclosed, which uses first and second capacitors to connect with a comparator, and the comparator connects with an NMOSFET connecting to a transformer. When the NMOSFET is turned off, the energy stored in the transformer is discharged and a resonant signal across the source and the drain is generated, and a first constant current charges the first capacitor at a start time point of the resonant signal until a voltage of the resonant signal first reaches to a crossing voltage. Then, a second constant current charges the second capacitor when the voltage of the resonant signal equals to the crossing voltage while the voltage of the resonant signal varies from high to low. Finally, the comparator turns on the NMOSFET when a voltage of the second capacitor equals to a voltage of the first capacitor.

13 Claims, 5 Drawing Sheets

VALLEY-DETECTION DEVICE FOR QUASI-RESONANCE SWITCHING AND METHOD USING THE SAME

BACKGROUND OF THE INVENTION

1. Field of the Invention

The present invention relates to a valley-detection technology, particularly to a valley-detection device for quasi-resonance switching and a method using the same.

2. Description of the Related Art

Flyback is one of the most popular topologies in medium and low power applications due to its simplicity. It can implement isolated switching mode power supplies (SMPS) with one switching component and one transformer resulting in low manufacturing cost. However, the switching losses are unavoidable in hard-switching mode.

As shown in FIG. 1 and FIG. 2, a power converter circuit includes a transformer 10 having a primary winding PW and a secondary winding SW and an N-channel metal oxide semiconductor field effect transistor (NMOSFET) 12 connected to the primary winding PW. An input high voltage $V_H$ is applied to the primary winding PW. A voltage $V_G$ is periodically applied ($T_{ON}$) to the gate of the NMOSFET 12 to control the transfer of power from the primary winding PW to the secondary winding SW. When the NMOSFET 12 is turned on, the energy is stored in the transformer 10. As the NMOSFET 12 is turned off, the stored energy in the transformer 10 is discharged.

A reflected voltage $V_R$ is generated when the NMOSFET 12 is turned off. As a result the voltage $V_{DS}$ across the NMOSFET 12 equals the input high voltage $V_H$ plus the reflected voltage $V_R$. While the NMOSFET 12 is turned off, a parasitic drain-to-source capacitor inherent in the NMOSFET 12 stores the energy from the voltage $V_D$.

After a discharge period $T_{DS}$ the energy of the transformer 10 is fully discharge and the energy stored in the parasitic drain-to-source capacitor flows back to the input high voltage $V_H$ through the primary winding PW of the transformer 10.

The primary winding PW and the parasitic drain-to-source capacitor along with parasitic elements on the secondary winding create a resonant tank with a resonant frequency $f_R$. While resonating, energy flows back and forth between the primary winding PW and the parasitic drain-to-source capacitor.

When the power converter circuit operates in discontinuous conduction mode (DCM) with a fixed frequency, the drain-to-source voltage of the MOSFET 12 is arbitrary. So the capacitive loss of the MOSFET during switch turn-on transition cannot be predicted and minimized.

To overcome the abovementioned problems, the present invention provides a valley-detection device for quasi-resonance switching and a method using the same, so as to solve the afore-mentioned problems of the prior art.

SUMMARY OF THE INVENTION

A primary objective of the present invention is to provide a valley-detection device for quasi-resonance switching and a method using the same, which respectively charges two capacitors when an N-channel metal oxide semiconductor field effect transistor (NMOSFET) is turned off. When the voltages of the capacitors are equal, a valley time point corresponding to any valley voltage of a resonant signal can be precisely found. Turning on the NMOSFET at the valley time point can effectively reduce switching power loss.

To achieve the abovementioned objectives, the present invention provides a valley-detection device for quasi-resonance switching, which connects with an NMOSFET, and a transformer has a primary winding and a secondary winding, and the primary winding connects with the drain of the NMOSFET and a high voltage terminal, and the source of the NMOSFET connects with a low voltage terminal, and the NMOSFET is turned on and energy from the high voltage terminal is stored in the primary winding. The valley-detection device comprises a first capacitor, a second capacitor and a first current source connecting with the first capacitor and the transformer. The energy is discharged from the secondary winding and a resonant signal across the source and the drain is generated when the NMOSFET is turned off. The first current source provides a first constant current to charge the first capacitor at a start time point of the resonant signal until a voltage of the resonant signal first reaches to a crossing voltage, which equals to a high voltage of the high voltage terminal plus a low voltage of the low voltage terminal, wherein a voltage of the resonant signal oscillates around a mid-level, and hereby referred to as the crossing voltage. The second capacitor is connected with a second current source providing a second constant current to charge the second capacitor when the voltage of the resonant signal equals to the crossing voltage while the voltage of the resonant signal varies from high to low, wherein the second current source is connected with the transformer. Additionally, a product of the second constant current and a capacitance of the first capacitor equals to a product of the first constant current and a capacitance of the second capacitor. The first capacitor, the second capacitor and the NMOSFET are all connected with a comparator generating a driving signal to turn on the NMOSFET when a voltage of the second capacitor equals to a voltage of the first capacitor.

The present invention also provides a valley-detection method for quasi-resonance switching, which respectively uses a first capacitor and a second capacitor to connect with a comparator, and the comparator connects with an NMOSFET, and a transformer has a primary winding and a secondary winding, and the primary winding connects with the drain of the NMOSFET and a high voltage terminal, and the source of the NMOSFET connects with a low voltage terminal, and the first capacitor and the second capacitor connects with the transformer. Firstly, the NMOSFET is turned on, and then the energy from the high voltage terminal is stored in the primary winding. Next, the NMOSFET is turned off whereby the energy is discharged from the secondary winding and a resonant signal across the source and the drain is generated, and a first constant current is provided to charge the first capacitor at a start time point of the resonant signal until a voltage of the resonant signal first reaches to a crossing voltage, which equals to a high voltage of the high voltage terminal plus a low voltage of the low voltage terminal, wherein a voltage of the resonant signal oscillates around a mid-level, and hereby referred to as the crossing voltage. Then, a second constant current is provided to charge the second capacitor when the voltage of the resonant signal equals to the crossing voltage while the voltage of the resonant signal varies from high to low, and a product of the second constant current and a capacitance of the first capacitor equals to a product of the first constant current and a capacitance of the second capacitor. Finally, the comparator generates a driving signal to turn on the NMOSFET when a voltage of the second capacitor equals to a voltage of the first capacitor.

Below, the embodiments are described in detail in cooperation with the drawings to make easily understood the technical contents, characteristics and accomplishments of the present invention.

DETAILED DESCRIPTION OF THE INVENTION

The present invention provides a valley-detection device for quasi-resonance switching and a method using the same which reduces switching power loss. The reason related to the method is introduced as below.

Figure 1:
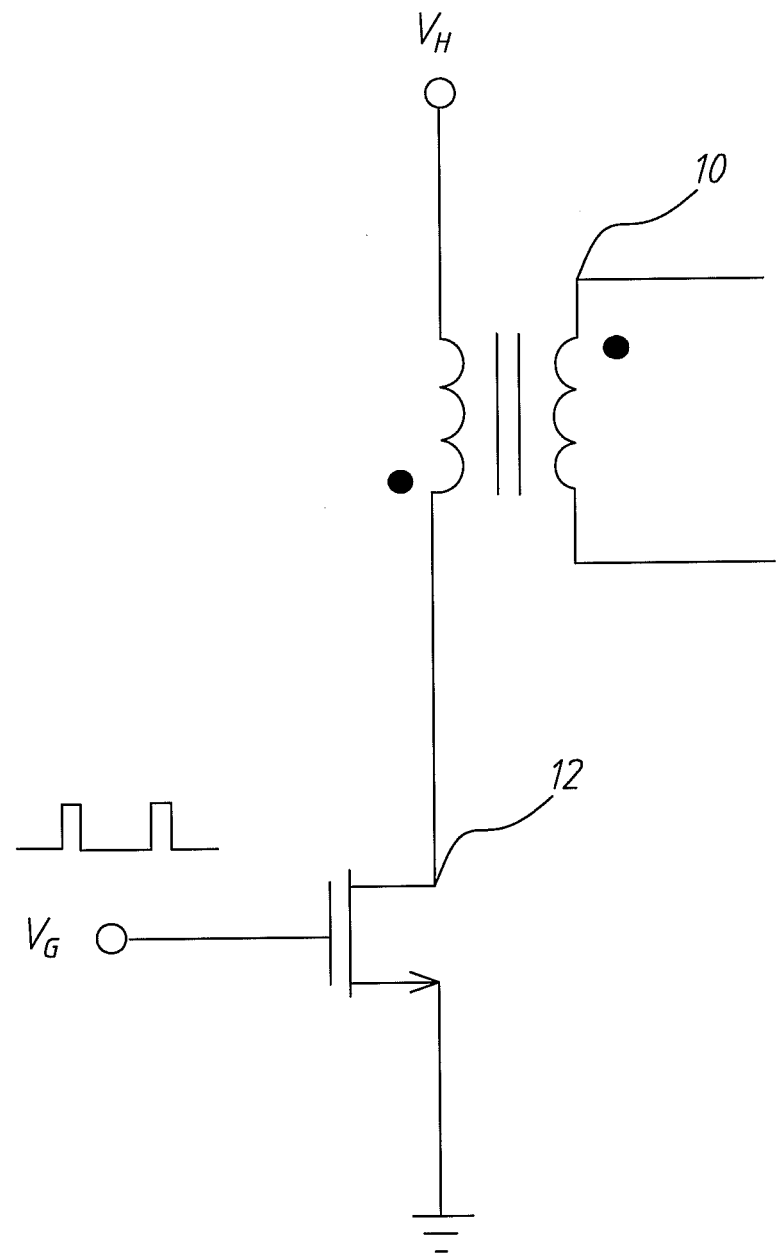
FIG. 1 is a schematic diagram illustrating a portion of a power converter circuit of the prior art.
Figure 2:
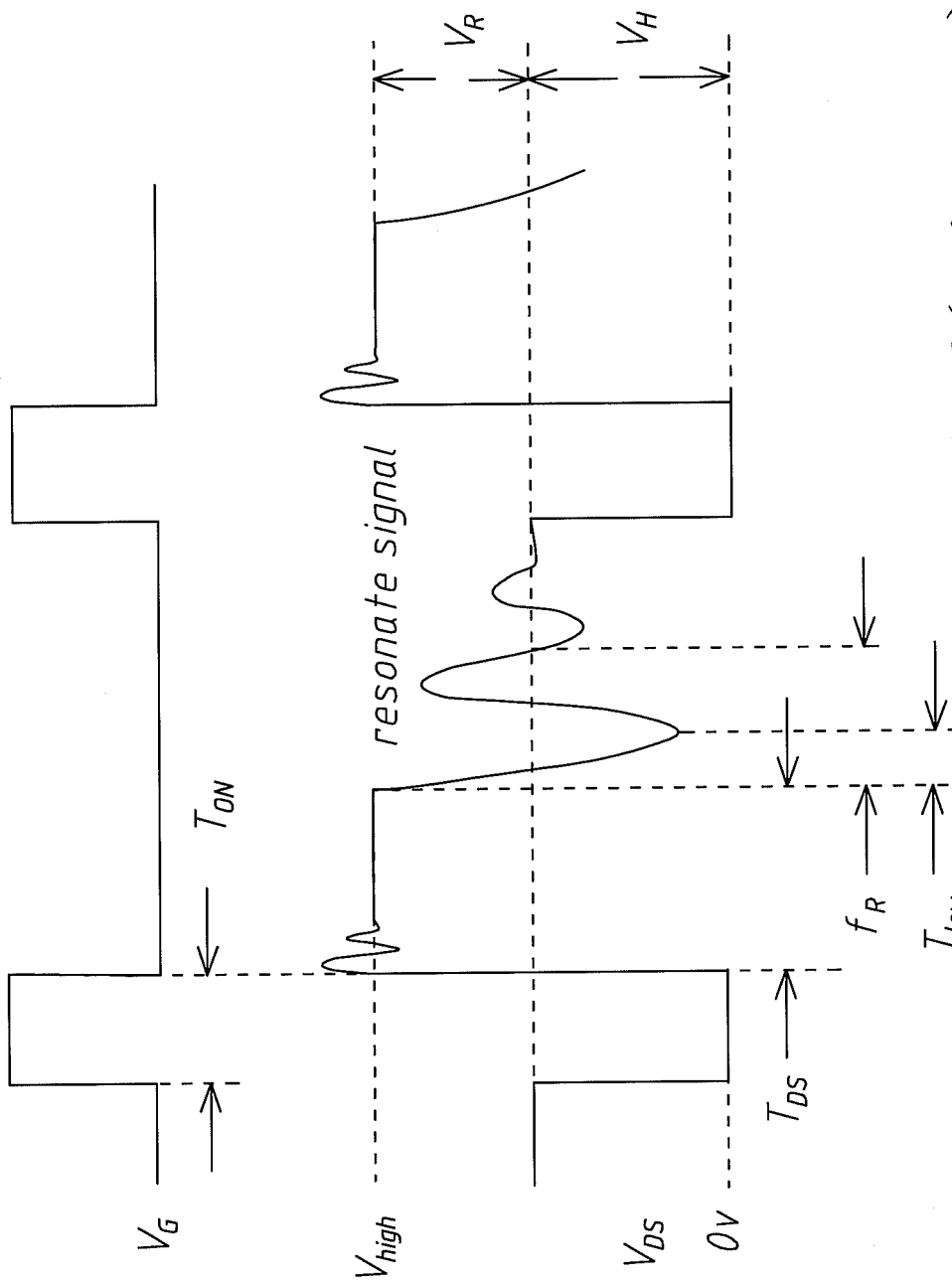
FIG. 2 is a diagram illustrating voltages in the circuit of FIG. 1.

Refer to FIG. 1 and FIG. 2. When the transistor is turned on, the $V_{DS}$ voltage is a grounding voltage. When the transistor is turned off and after the transformer energy is fully discharged, a resonant signal is generated across the drain and the source. The resonant signal is a sine wave signal whose voltage oscillates around a mid-level, and is hereby referred to as a high voltage $V_H$. In other words, the voltage of the resonant signal is gradually close to the high voltage $V_H$. The voltage of the resonant signal begins to drop from a voltage $V_{high}$ corresponding to a start time point, wherein the voltage $V_{high}$ is larger than the high voltage $V_H$. When the voltage of the resonant signal first reaches the high voltage $V_H$, the present time is defined as a crossing time point. When the voltage of the resonant signal first reaches a valley voltage, the present time is defined as a valley time point. A period between the start time point and the crossing time point approximates to a period between the crossing time point and the valley time point due to the sine wave signal. For reducing switching power loss, turning on the transistor at the valley time point of the resonant signal to obtain maximum efficiency. However, the resonant signal has different valley voltages. The present invention can precisely find any valley voltage and the corresponding time point to reduce switching power loss.

Figure 3:
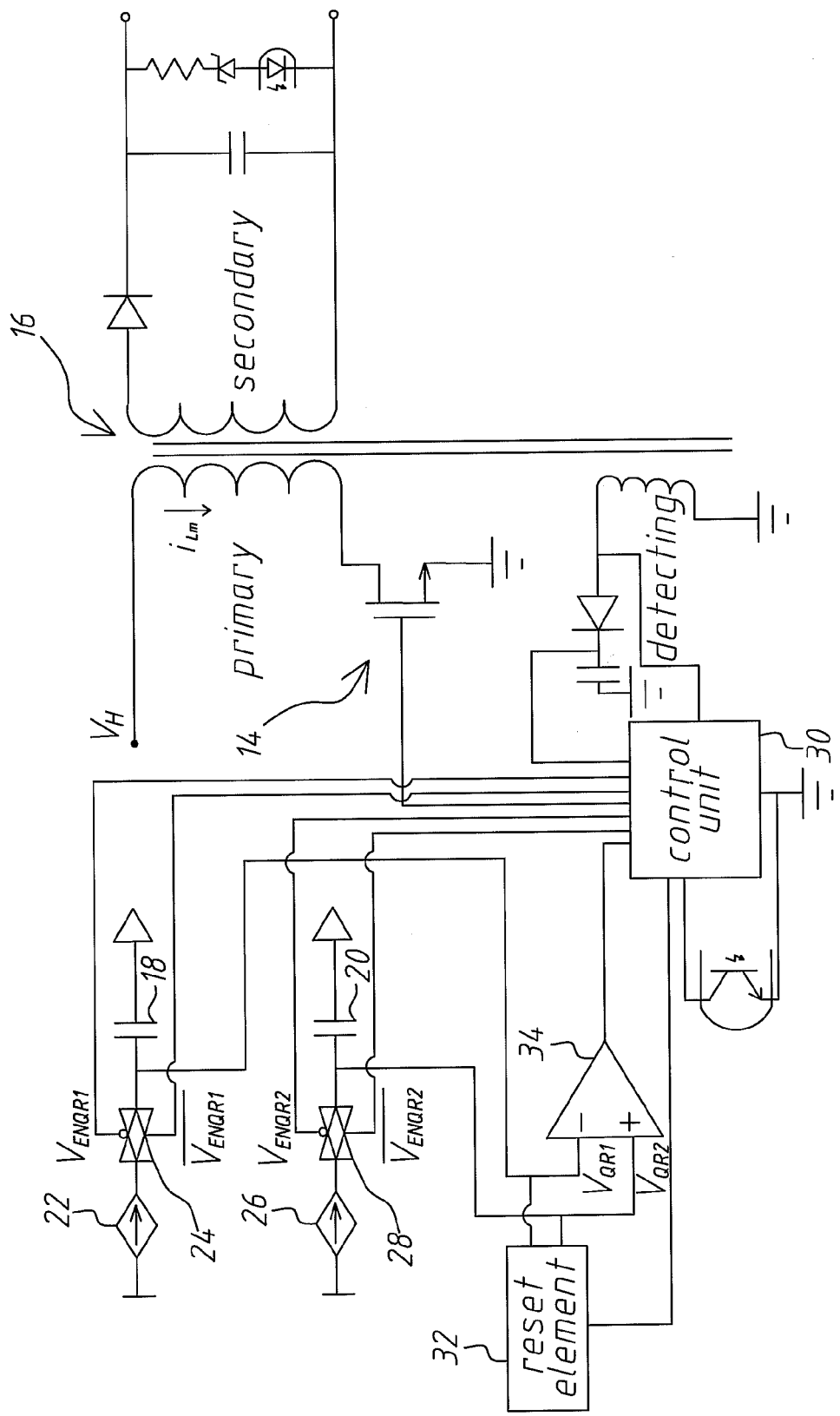
FIG. 3 is a schematic diagram illustrating a portion of a power converter circuit according to an embodiment of the present invention.
Figure 4:
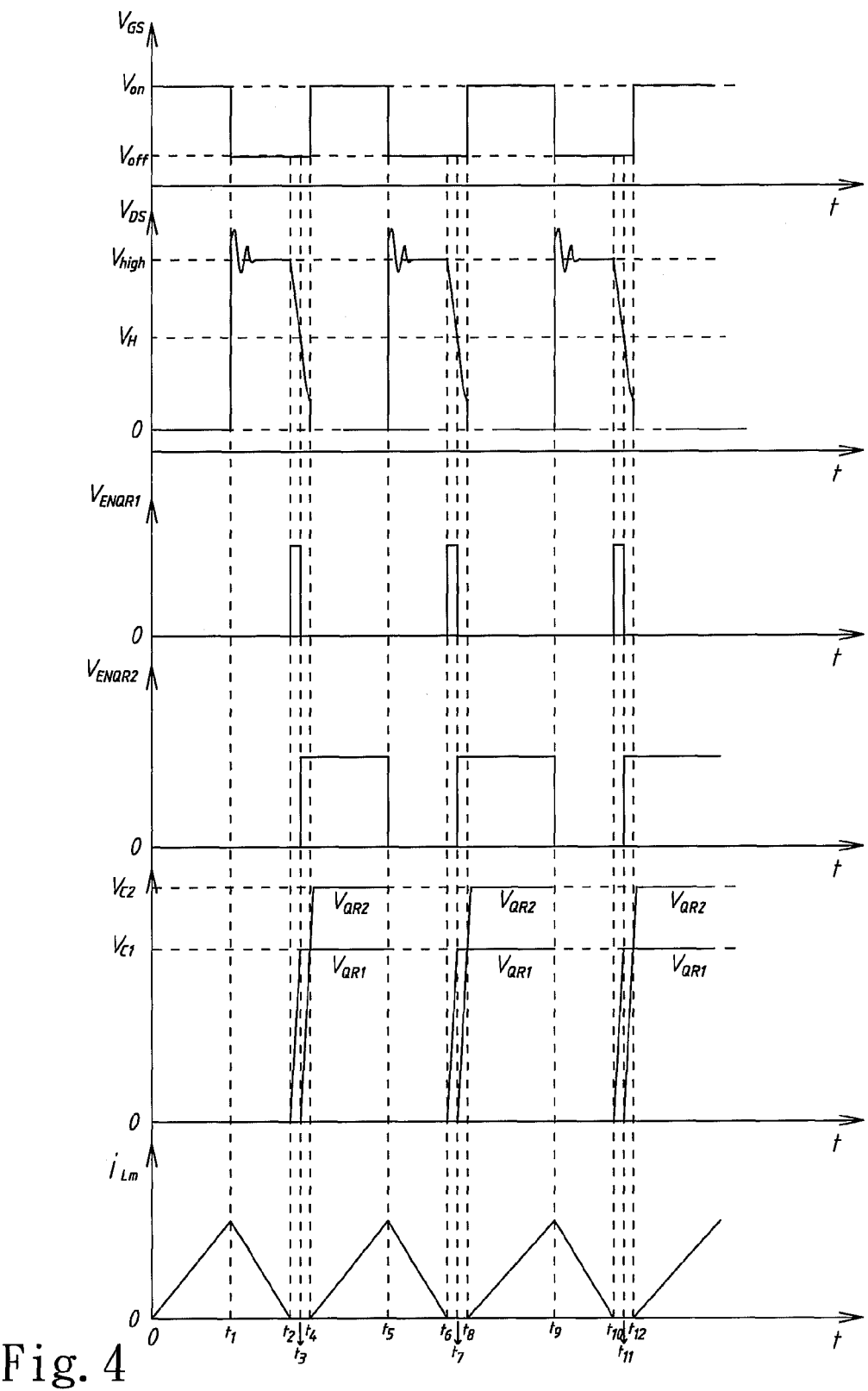
FIG. 4 is a diagram illustrating voltages and currents in the circuit of FIG. 3.

Refer to FIG. 3 and FIG. 4. Based on the abovementioned principle, the valley-detection device of the present invention connects with an N-channel metal oxide semiconductor field effect transistor (NMOSFET) 14, and a transformer 16 has a primary winding, a secondary winding and a plurality of accessory windings, wherein one of the accessory windings used as a detecting winding. The primary winding connects with the drain of the NMOSFET 14 and a high voltage terminal, and the source of the NMOSFET 14 connects with a low voltage terminal, and the NMOSFET 14 is turned on and energy from the high voltage terminal is stored in the primary winding. In the embodiment, the high voltage terminal has the high voltage $V_H$, the low voltage terminal is grounded and the low voltage of the low voltage terminal is the grounding voltage, which is used as an example.

The valley-detection device comprises a first capacitor 18 and a second capacitor 20. The first capacitor 18 is connected with a first current source 22. The energy is discharged from the secondary winding and a resonant signal across the source and the drain is generated when the NMOSFET 14 is turned off. The first current source 22 provides a first constant current to charge the first capacitor 18 at the start time point of the resonant signal until a voltage of the resonant signal first reaches to a crossing voltage, which equals to the high voltage $V_H$ of the high voltage terminal plus the low voltage of the low voltage terminal, wherein the voltage of the resonant signal oscillates around a mid-level, and hereby referred to as the crossing voltage. A first switch 24 is connected with between the first constant current source 22 and the first capacitor 18, wherein the first switch 24 is turned on during the period between the start time point and a crossing time point corresponding to the crossing voltage that the voltage of the resonant signal first reaches to, and the first switch 24 is turned off during the other period.

The second capacitor 20 is connected with a second current source 26. The second current source 26 provides a second constant current to charge the second capacitor 20 when the voltage of the resonant signal equals to the crossing voltage while the voltage of the resonant signal varies from high to low. For fording the valley voltage of the resonant signal, a product of the second constant current and a capacitance of the first capacitor 18 equals to a product of the first constant current and a capacitance of the second capacitor 20. A second switch 28 is connected with between the second constant current source 26 and the second capacitor 20. The second switch 28 is turned on when the voltage of the resonant signal equals to the crossing voltage while the voltage of the resonant signal varies from high to low, until the NMOSFET 14 is turned off.

The first switch 24, the second switch 28, the gate of the NMOSFET 14, a reset element 32 and the detecting winding are connected with a control unit 30. Besides, the control unit 30 can detect the drain-to-source voltage of the NMOSFET 14 through the primary winding and the detecting winding to control the conduction state of the NMOSFET 14, the first switch 24, the second switch 28 and the reset element 32. The first capacitor 18 and the second capacitor 20 are also connected with the reset element 32. The reset element 32 can fully discharge the first capacitor 18 and the second capacitor 20 when the NMOSFET 14 is turned on. The first capacitor 18, the second capacitor 20 and the control unit 30 are respectively connected with a negative input terminal, a positive input terminal and an output terminal of a comparator 34. The comparator 34 generates a driving signal to turn on the NMOSFET 14 when the voltage of the second capacitor 20 equals to the voltage of the first capacitor 18.

Figure 5:
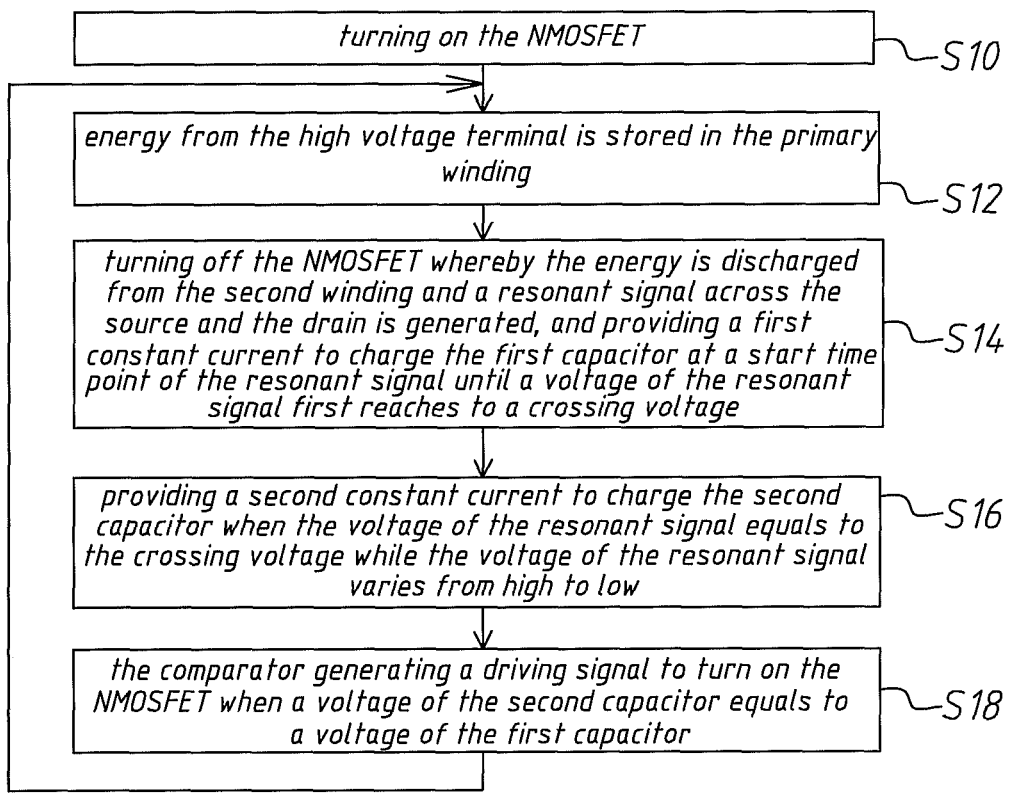
FIG. 5 is a flowchart illustrating a power loss reduction method related to FIG. 4 according to an embodiment of the present invention.

Below is the operation process of the valley-detection device. Refer to FIG. 3-FIG. 5. The voltages $V_{ENQR1}$ and $V_{ENQR2}$ respectively denote the voltages received by the first and second switches 24 and 28. The voltages $V_{QR1}$ and $V_{QR2}$ respectively denote the voltages of the first and second capacitors 18 and 20. The current $i_{Lm}$ denotes the current flowing through the primary winding of the transformer 16.

Firstly, in Step S10, the control unit 30 turns on the NMOSFET 14 at t=0. Then, in Step S12, the energy from the high voltage terminal is stored in the primary winding and the current $i_{Lm}$ is higher and higher. Next, in Step S14, the control unit 30 turns off the NMOSFET 14 at $t_1$ whereby the energy is discharged from the secondary winding and the current $i_{Lm}$ is lower and lower. Afterward, the energy has been completely discharged and the resonant signal across the source and the drain of the NMOSFET 14 is generated at the start time point $t_2$. At the start time point $t_2$, the control unit 30 detects the resonant signal via the primary winding and the detecting winding to turn on the first switch 24, so that the first current source 22 provides the first constant current to charge the first capacitor 18 through the first switch 24, until the voltage of the resonant signal first reaches to the crossing voltage $V_H$. As a result, the voltage $V_{QR1}$ of the first switch 18 is maintained at $V_{C1}$. Next, in Step S16, the control unit 30 detects the resonant signal via the primary winding and the detecting winding to turn on the second switch 28, so that the second current source 26 provides the second constant current to charge the second capacitor 20 through the second switch 28 when the voltage of the resonant signal equals to the crossing voltage $V_H$ while the voltage of the resonant signal varies from high to low. However, Step 16 can be executed at one of the corresponding time points. In the embodiment, Step 16 is executed at the time point $t_3$ that the voltage of the resonant signal first reaches to the crossing voltage $V_H$. Therefore, the control unit 30 detects the resonant signal via the primary winding and the detecting winding to turn on the second switch 28, so that the second current source 26 provides the second constant current to charge the second capacitor 20 through the second switch 28 at $t_3$, until the control unit 30 turns off the NMOSFET 14. Then, in Step S18, the comparator 34 generates the driving signal to the control unit 30, so as to turn on the NMOSFET 14 when the voltage $V_{QR2}$ of the second capacitor 20 equals to the voltage $V_{QR1}$ of the first capacitor 18. The present time point is defined as $t_4$. A valley time point $t_4$ corresponding to the first valley voltage of the resonant signal is precisely found, which effectively reduces switching power loss.

Finally, returning to Step S12. At the same time, the voltage $V_{QR2}$ of the second capacitor 20 is maintained at maximum voltage $V_{C2}$. Besides, the control unit 30 drives the reset element 32 to discharge the first capacitor 18 and the second capacitor 20 fully, until the control unit 30 turns off the NMOSFET 14.

In above-mentioned process, Step S10-S18 are only comprised, and the other steps can be omitted. The goal of reducing switching power loss is still achieved.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A valley-detection method for quasi-resonance switching, which respectively uses a first capacitor and a second capacitor to connect with a comparator, and said comparator connects with an N-channel metal oxide semiconductor field effect transistor (NMOSFET), and a transformer has a primary winding and a secondary winding, and said primary winding connects with a drain of said NMOSFET and a high voltage terminal, and a source of said NMOSFET connects with a low voltage terminal, and said first capacitor and said second capacitor connects with said transformer;

said method comprising steps of:
   Step (A): turning on said NMOSFET;
   Step (B): energy from said high voltage terminal is stored in said primary winding;
   Step (C): turning off said NMOSFET whereby said energy is discharged from said secondary winding and a resonant signal across said source and said drain is generated, and providing a first constant current to charge said first capacitor at a start time point of said resonant signal until a voltage of said resonant signal first reaches to a crossing voltage, which equals to a high voltage of said high voltage terminal plus a low voltage of said low voltage terminal, wherein the voltage of said resonant signal oscillates around a mid-level, and is hereby referred to as said crossing voltage;
   Step (D): providing a second constant current to charge said second capacitor when said voltage of said resonant signal equals to said crossing voltage while said voltage of said resonant signal varies from high to low, and a product of said second constant current and a capacitance of said first capacitor equals to a product of said first constant current and a capacitance of said second capacitor; and
   Step (E): said comparator generating a driving signal to turn on said NMOSFET when a voltage of said second capacitor equals to a voltage of said first capacitor.

2. The valley-detection method for quasi-resonance switching of claim 1, wherein said low voltage terminal is grounded and said low voltage is a grounding voltage.

3. The valley-detection method for quasi-resonance switching of claim 1, wherein said first and second capacitors are respectively connected with a negative input terminal and a positive input terminal of said comparator.

4. The valley-detection method for quasi-resonance switching of claim 1, further comprising a step of fully discharging said first capacitor and said second capacitor and returning to Step (B).

5. The valley-detection method for quasi-resonance switching of claim 1, wherein said transformer further has a plurality of accessory windings, and wherein one of said accessory windings used as a detecting winding is connected with said first capacitor and said second capacitor, and wherein said resonant signal is detected by said primary winding and said detecting winding.

6. A valley-detection device for quasi-resonance switching, which connects with an N-channel metal oxide semiconductor field effect transistor (NMOSFET), and a transformer has a primary winding and a secondary winding, and said primary winding connects with a drain of said NMOSFET and a high voltage terminal, and a source of said NMOSFET connects with a low voltage terminal, and said NMOSFET is turned on and energy from said high voltage terminal is stored in said primary winding, said valley-detection device comprising:
   a first capacitor;
   a second capacitor;
   a first current source connecting with said first capacitor and said transformer, wherein said energy is discharged from said secondary winding and a resonant signal across said source and said drain is generated when said NMOSFET is turned off, and wherein said first current source provides a first constant current to charge said first capacitor at a start time point of said resonant signal until a voltage of said resonant signal first reaches to a crossing voltage, which equals to a high voltage of said high voltage terminal plus a low voltage of said low voltage terminal, and wherein the voltage of said resonant signal oscillates around a mid-level, and is hereby referred to as said crossing voltage;
   a second current source connecting with said second capacitor and said transformer, and providing a second constant current to charge said second capacitor when said voltage of said resonant signal equals to said crossing voltage while said voltage of said resonant signal varies from high to low, and a product of said second constant current and a capacitance of said first capacitor equals to a product of said first constant current and a capacitance of said second capacitor; and a comparator connecting with said first capacitor, said second capacitor and said NMOSFET, and generating a driving signal to turn on said NMOSFET when a voltage of said second capacitor equals to a voltage of said first capacitor.

7. The valley-detection device for quasi-resonance switching of claim 6, wherein said low voltage terminal is grounded and said low voltage is a grounding voltage.

8. The valley-detection device for quasi-resonance switching of claim 6, further comprising a reset element connecting with said NMOSFET, said first capacitor, and said second capacitor and fully discharging said first capacitor and said second capacitor when said NMOSFET is turned on.

9. The valley-detection device for quasi-resonance switching of claim 6, further comprising a first switch connected with between said first constant current source and said first capacitor, and connected with said transformer, wherein said first switch is turned on during a period between said start time point and a crossing time point corresponding to said crossing voltage that said voltage of said resonant signal first reaches to, and said first switch is turned off during an other period.

10. The valley-detection device for quasi-resonance switching of claim 6, further comprising a second switch connected with between said second constant current source and said second capacitor, and connected with said transformer, wherein said second switch is turned on when said voltage of said resonant signal equals to said crossing voltage while said voltage of said resonant signal varies from high to low, until said NMOSFET is turned off.

11. The valley-detection device for quasi-resonance switching of claim 6, wherein said first and second capacitors are respectively connected with a negative input terminal and a positive input terminal of said comparator.

12. The valley-detection device for quasi-resonance switching of claim 6, wherein said transformer further has a plurality of accessory windings, and wherein one of said accessory windings used as a detecting winding is connected with said first current source and said second current source, and wherein said resonant signal is detected by said primary winding and said detecting winding.

13. The valley-detection device for quasi-resonance switching of claim 12, further comprising a control unit connected with said first current source, said second current source and said detecting winding, wherein said control unit detects said resonant signal via said primary winding and said detecting winding, so as to control a conduction state of said NMOSFET.

* * * * *